G. G. Carver,
Flour Sieve.
Nº 52,266.          Patented Jan. 30, 1866.
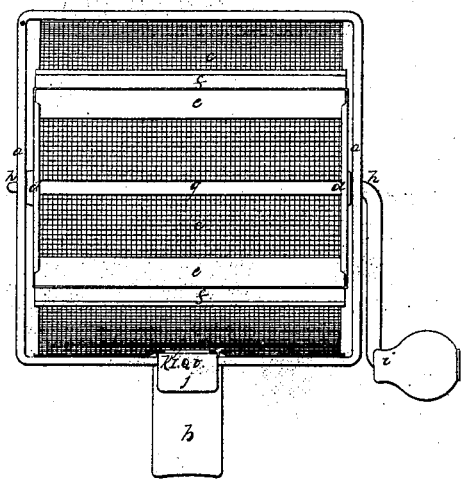
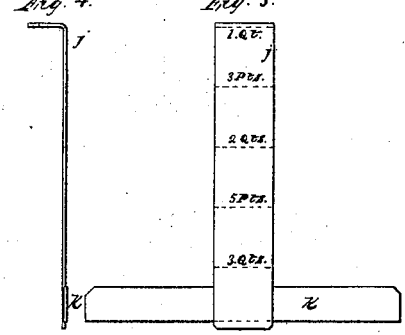
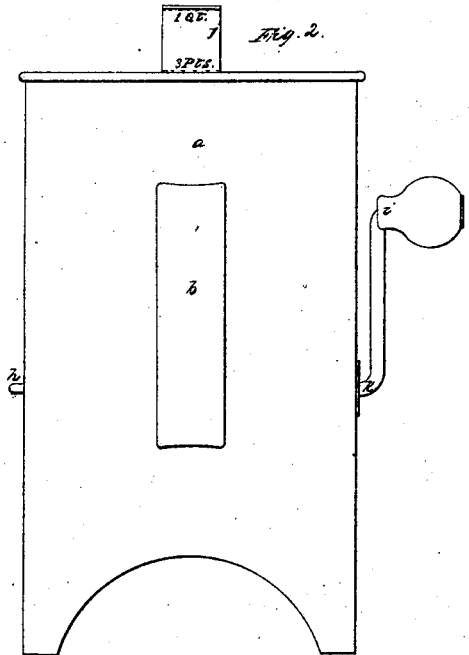
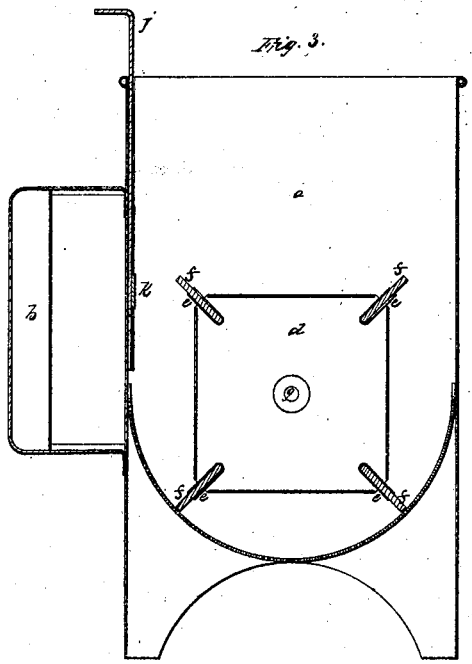
Witnesses
Chas. W. Hawkes
John G. Lewis
Inventor:
Geo. G. Carver

UNITED STATES PATENT OFFICE.

GEORGE G. CARVER, OF ROXBURY, MASSACHUSETTS.

FLOUR SIFTER AND MEASURE.

Specification forming part of Letters Patent No. 52,266, dated January 30, 1866.

*To all whom it may concern:*

Be it known that I, GEO. G. CARVER, of Roxbury, in the county of Norfolk and Commonwealth of Massachusetts, have invented a new and useful Improvement on a Flour Sifter and Measure Combined; and I do hereby declare that the following is a full, clear, and exact description of the construction and operation of the same, reference being had to the accompanying drawings, making a part of this specification, and to the letters of reference marked thereon, in which—

Figure 1 is a plan. Fig. 2 is a front elevation. Fig. 3 is a transverse section, and Figs. 4 and 5 represent the vertical sliding scale for indicating measurement.

The nature of my invention consists in constructing a flour-sifter in a suitable and convenient form for dipping flour or meal from the barrel and providing it with a sliding scale graduated to indicate measurement, so that the exact amount of flour required to be taken into the sieve may readily be determined.

In the drawings herein referred to, $a$ represents the body of the sieve; $b$, the handle; $c$, the wire-netting or bottom of the sieve; $d$, the fan-wheel; $e$, the fans; $f$, the felting; $g$, the shaft; $h$, the journals; $i$, the crank; $j$, the vertical sliding scale, and $k$ the horizontal bar attached to the scale.

To enable others skilled in the art to make and use my invention, I will proceed to describe its construction and operation.

I construct the body of my sieve $a$ in any form or size which shall make it most convenient, and attach a handle, $b$, thereto, by which it is held. The bottom of this sieve is made of wire-netting $c$, in a semicircular form, and directly over it there is a fan-wheel, $d$, fitted to revolve in close proximity thereto. The fan-wheel $d$ has four pans, $e$, each of which is provided with a strip of felting, $f$, secured thereto. The wheel also has a shaft, $g$, running through its center, with journals $h$ at each end, on which it revolves. On one end of the shaft, outside of the body of the sieve, there is a crank, $i$, by which the fan-wheel is made to revolve.

For measurement I attach to the inner side of the body of the sieve a vertical sliding scale, $j$, with a horizontal bar, $k$, attached to its lower end. This scale is graduated so as to indicate the different quantities required to be measured, and is made to slide up and down, and so closely fitted that it will remain in whatever position it may be placed.

Operation of the scale: Place the scale in its lowest position; then fill the sieve up to the lower edge of the horizontal bar, and it will indicate one quart by a horizontal mark on the scale at the top of the sieve. Then again elevate the scale so as to bring the line marked three pints just to the top of the sieve and fill the sieve up to the lower edge of the horizontal bar, as before, and you have just three pints in the sieve. This is the position in which the scale is represented in Figs. 2 and 3. Again elevate the scale to the line marked two quarts and fill up as before, and you have just two quarts in the sieve, and so on through all the different degrees marked on the scale.

Operation of the sieve: Put the requisite quantity of flour into the sieve; then hold it firmly by the handle $b$ in one hand and turn the crank $i$ with the other hand. The fan-wheel $d$ is thereby made to revolve, causing the flour to pass freely through the sieve.

Having thus fully described the construction and operation of my improvements, I will now proceed to point out the parts which I claim as my invention and desire to secure by Letters Patent:

A sliding scale to indicate the quantity of flour, as described, in combination with a flour-sifter.

GEO. G. CARVER.

Witnesses:
CHAS. W. HAWKES,
JOHN G. LEWIS.